(12) United States Patent
Kubo (10) Patent No.: US 11,181,129 B2
(45) Date of Patent: Nov. 23, 2021

(54) ROTARY DRIVE DEVICE AND CONTROL METHOD THEREOF

(71) Applicant: EISHIN TECHNOLOGY CO., LTD, Kanagawa (JP)

(72) Inventor: Chikanari Kubo, Kanagawa (JP)

(73) Assignee: EISHIN TECHNOLOGY CO., LTD, Kanagawa (JP)

( * ) Notice: Subject to any disclaimer, the term of this patent is extended or adjusted under 35 U.S.C. 154(b) by 0 days.

(21) Appl. No.: 17/057,858

(22) PCT Filed: Feb. 14, 2019

(86) PCT No.: PCT/JP2019/005268
§ 371 (c)(1),
(2) Date: Nov. 23, 2020

(87) PCT Pub. No.: WO2020/165991
PCT Pub. Date: Aug. 20, 2020

(65) Prior Publication Data
US 2021/0207625 A1    Jul. 8, 2021

(51) Int. Cl.
*F15B 15/06* (2006.01)

(52) U.S. Cl.
CPC ................... *F15B 15/06* (2013.01)

(58) Field of Classification Search
CPC ........................................ F15B 15/06
See application file for complete search history.

(56) References Cited

U.S. PATENT DOCUMENTS

| 4,518,011 A | 5/1985 | Stoll |
| 5,121,805 A * | 6/1992 | Collie ................ B62D 57/024 180/8.1 |
| 10,072,744 B2 * | 9/2018 | Smith ..................... F16H 21/44 |
| 10,531,966 B2 * | 1/2020 | Boender ................... A61F 2/70 |
| 2015/0005686 A1 * | 1/2015 | Kazerounian ......... A61F 5/0123 602/16 |

(Continued)

FOREIGN PATENT DOCUMENTS

| EP | 1136703 A1 | 9/2001 |
| GB | 1301236 A | 12/1972 |
| JP | 53129780 | 11/1978 |

(Continued)

OTHER PUBLICATIONS

International Search Report for PCT/JP2019/002971, dated May 7, 2019, 2 pages.

(Continued)

*Primary Examiner* — Thomas E Lazo
(74) *Attorney, Agent, or Firm* — Cozen O'Connor (57) ABSTRACT

Provided is a rotation drive device that has a wide rotary driving range, e.g. a rotary driving range of 0°-180°. Disclosed is a rotation drive device comprising a crank member rotatable about a crank axis, a first cylinder having a first piston and rotatable about a first cylinder rotation axis, and a second cylinder having a second piston and rotatable about a second cylinder rotation axis. The crank member and the first piston are coupled for rotation about a first piston rotation axis spaced from the crank axis. The crank member and the first piston are coupled for rotation about a second piston rotation axis spaced from the crank axis.

4 Claims, 9 Drawing Sheets

(56) References Cited

U.S. PATENT DOCUMENTS

2021/0007817 A1* 1/2021 Dong .................... A61B 34/37

FOREIGN PATENT DOCUMENTS

| | | |
|---|---|---|
| JP | 60-35982 | 3/1985 |
| JP | S60249705 A | 12/1985 |
| JP | H07259801 A | 10/1995 |
| JP | 9291904 | 11/1997 |
| JP | 2006057719 A | 3/2006 |
| JP | 2007187296 A | 7/2007 |
| JP | 2011127560 A | 6/2011 |
| JP | 5108609 B2 | 10/2012 |

OTHER PUBLICATIONS

International Search Report for PCT/JP2019/005268, dated May 28, 2019, 1 page.
International Search Report for PCT/JP2020/00715, dated Feb. 18, 2020, 2 pages.
International Search Report for PCT/JP2019/005268, dated Oct. 8, 2019, 4 pages.

* cited by examiner

ROTARY DRIVE DEVICE AND CONTROL METHOD THEREOF

TECHNICAL FIELD

The present invention relates to a rotation drive device, for example, a rotation drive device that can be used for driving a humanoid robot or the like.

BACKGROUND ART

Many large enterprises and capable researchers have been researching robots for at least 50 years, but practical humanoid robots that can actually work on behalf of humans in disaster sites, nursing care sites, homes, etc. have not yet been realized.

Conditions for Realizing a Human Robot

In order to realize a humanoid robot, it is necessary to design a large number of actuators and related parts according to the number of joints with a weight equivalent to that of a human being and to accommodate them in a volume equivalent to that of the human being, and moreover, each actuator is required to have a strong power according to the work.

Actuator Type

The actuator is of three types: electric, hydraulic, and pneumatic, but for the reasons described below, no actuator satisfying the above-mentioned conditions has been realized in any of the types above.

Electric Servo Motor Control Technology

This is the most advanced control technology and is widely used in industry. Many researchers have also been developing humanoid robots using electric servo motors, and robots that can perform close to human performance by using AI and others have also been developed. On the other hand, there is a problem that the motor and the speed reducer are very heavy and the power per unit volume of the actuator is small. If the power is to be increased, the actuator becomes larger and heavier, and the effects are canceled out. When a large current is applied to a small actuator to generate power, the amount of heat generated increases, resulting in breakage. In order to prevent this, cooling is required, and the weight and volume are eventually increased. Even if only weight and volume problems are considered, it is impossible to realize a humanoid robot using many electric servomotors. In addition, a servo amplifier is required for operation control, and a torque detection and a protection circuit are required to prevent breakage when an overload or a reaction force is applied, resulting in a problem that the structure is complicated.

Hydraulic Servo Control Technology

Like the electric servo motor control technology, this technology is widely used in the industry and is an indispensable technology for manufacturing machine and industrial machines. The greatest advantage is the large power per actuator unit volume. The control equipment is abundant, and the servo technology of the hydraulic pressure is also highly evolved. On the other hand, from the viewpoint of application to a humanoid robot, the greatest drawback is that an oil hydraulic pressure source must be mounted. Since the hydraulic pressure source is driven by a motor or an engine, the weight and volume become very large. A servo amplifier is also required. Therefore, it is very difficult to realize a humanoid robot by a hydraulically driven technology. In addition, the oil pressure is poor in compressibility, and there is a possibility that the oil pressure may cause damage to surrounding objects and people due to overload, or that the oil leak may contaminate the surroundings, making it difficult to use the hydraulically driven technology in interpersonal applications.

Pneumatic Servo Control Technology

Pneumatic cylinders (pneumatic actuators) can have a reduced weight because aluminum can be used as main components, have advantages of large power per unit volume, and are widely used as drive sources in various fields. However, servo control of pneumatic cylinders is a very difficult technique. Although the purpose of the servo is to control the piston position and/or speed, the drive of the pneumatic cylinder is basically accompanied by compressibility and friction, making accurate control difficult compared to the electric and hydraulic systems.

Figure 7:
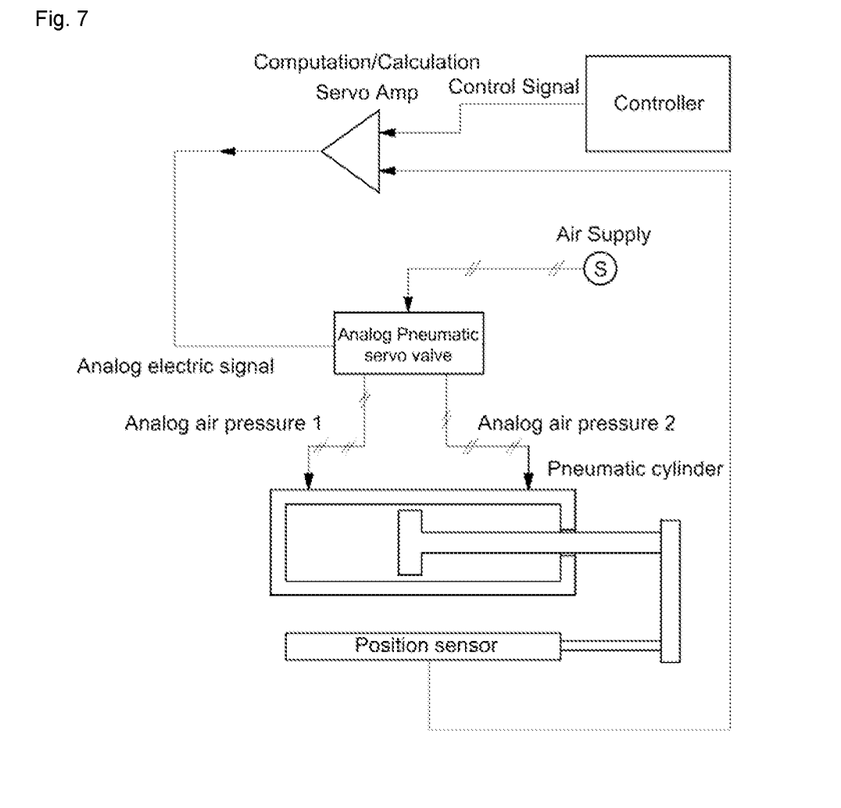
FIG. 7 shows a block diagram of a conventional pneumatic servo control.

FIG. 7 shows a block diagram of a conventional pneumatic servo control. This block diagram is basically the same for the electric servo and the hydraulic servo. The output signal of the position sensor may be digital or analog. Typically, the command signal will be a digital signal.

The pneumatic servo amplifier generally detects a difference between the command signal and the position sensor information, and controls the pneumatic servo valve on the basis of the digital calculation processing such as PID, which is optimal control. However, currently commonly available pneumatic servo valves are limited to analog types. Presently available pneumatic servo valves mainly employs a spool type servo valve (Patent Document 1) or a flapper type servo valve (Patent Document 2), both of which are of an analog system.

Figure 8:
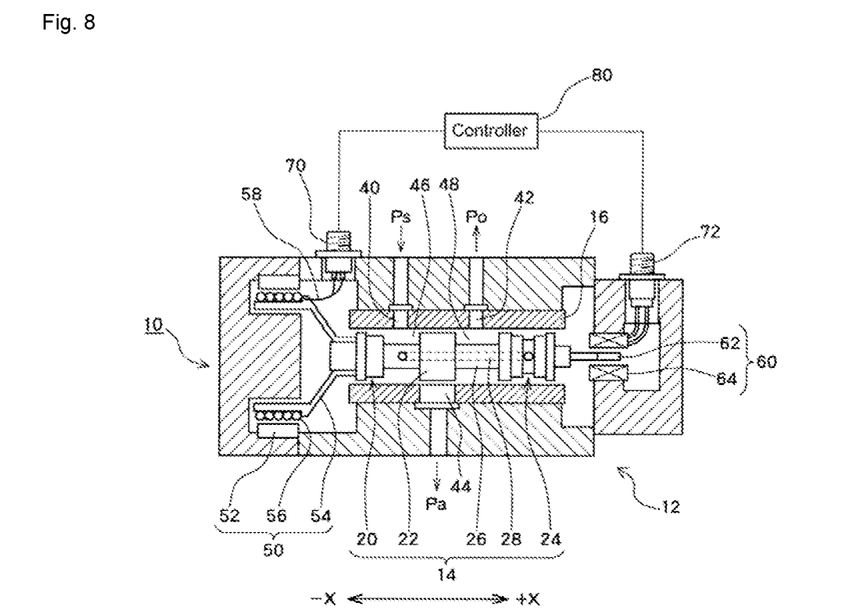
FIG. 8 shows a conventional spool type servo valve.

FIG. 8 is a spool type servo valve of Patent Document 1, which includes a sleeve 16 having a supply flow path 40, an exhaust port 42 and a load flow path 44 and a spool 14 having three lands 20, 22, and 24, and the spool 14 is driven in the X direction by a solenoid type linear motor 50. When the land 22 is moved in the +X direction from the state in which the land 22 coincides with the load flow path 44, air Pa is supplied from the pneumatic source Ps to the pneumatic cylinder (not shown), when the land 22 is moved in the −X direction, air is exhausted from the pneumatic cylinder, and when the land 22 coincides with the load flow path 44, the supply and exhaust are stopped. The position or speed of the pneumatic cylinder is adjusted by the opening of the load path 44 due to the movement of the land 22.

Figure 9:
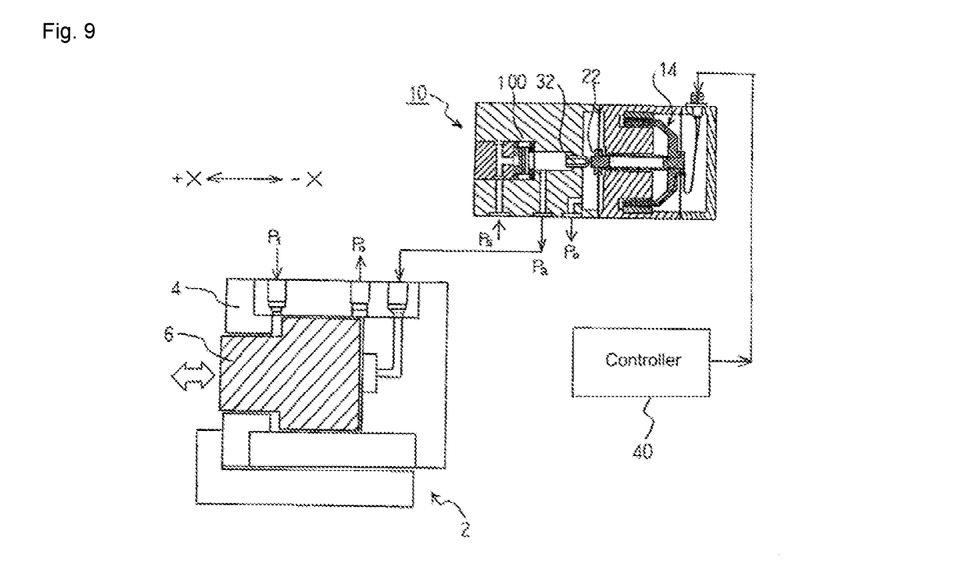
FIG. 9 shows a conventional flapper type servo valve.

FIG. 9 is a flapper type servo valve of Patent Document 2, in which the exhaust port 32 is opened and closed by the movement of the flapper 22 in the X direction by the solenoid type linear motor 14, and the position of the movable body 6 is controlled by supplying a back pressure Pa as reduced in accordance with the opening degree of the exhaust port 32 to the pneumatic cylinder 2.

Each of the above servo valves is an analog system in which the valve opening degree is adjusted by controlling the spool 14 or the flapper 22 with a solenoid, and a servo amplifier is indispensable. In addition, since the valve opening degree must be precisely controlled, a very advanced manufacturing techniques and controlling techniques are required. Further, since each of the servo valves needs to be operated while bleeding air in order to reduce friction or the like, the necessary amount of the compressed air becomes enormous as the number of servo valves increases. These are considered to be the reasons why pneumatic cylinders have hardly been developed in the field of position control where certain degree of accuracy is required, such as a humanoid robot.

The drawbacks of the electric and hydraulic servos described above are fundamental and principally inevitable irrespective of any effort. Although humanoid robots using electric servo control will continue to be studied in the future due to the ease of precise control and the like, the present inventor believes that even if a huge budget and a large number of human resources are invested, the realization is impossible. In the case of an electric servo, first, the magnetic force is converted into a magnetic force by a coil, and then the motor is rotated by repulsion between magnetic forces. Here, the flowing current value itself is a source of the output power. When an electric current flows, heat is generated and a part of the energy becomes thermal energy. Further as the rotational energy at a higher speed rotation is required to be decelerated again, the energy efficiency drops rapidly as the deceleration is performed in order to generate a force. The power is decreased by the heat, and the available energy decreases as the deceleration increases.

If a high-power actuator, which can be called an artificial muscle, is developed, it is considered that there is a new development. Because human muscles are present, equivalents will eventually be able to artificially be developed. However, the present inventors believe that, in the present state in which such an actuator does not exist, the pneumatic servo control system is the only option for realizing a humanoid robot.

Compressed air can be produced by rotating a compressor with an electric motor for a certain period of time. At this time, the size and power of the electric motor and the compressor are not limited. In other words, the compressed air is the energy itself of high density and acts directly for the driving a cylinder. Therefore, it is possible to generate power necessary for the humanoid robot without increasing the volume and weight. The disadvantages of the pneumatic system are as described above, but none is fundamental. Compressibility is inevitable in pneumatic servos, but cylinder friction is reduced to an extreme, depending on the design. In addition, in a humanoid robot, accurate control such as in machining tools and industrial machines is not necessary, because humans do not perform such accurate movements at all. In conventional pneumatic servo valves, servo amplifiers and extremely sophisticated machining techniques are required because they employ analog systems for controlling air pressure.

The inventor of the present application has solved the above-mentioned problems based on the above-mentioned consideration, and has invented a servo valve unit capable of achieving the above-mentioned CONDITIONS FOR REALIZING A HUMAN ROBOT, and has filed PCT/JP2019/002971. That is, a servo valve unit operating according to first and second electric pulses according to the position of a piston of a pneumatic cylinder, the servo valve unit having a common flow path, a supply port connected to the common flow path through a first valve portion that opens and closes in a pulsed manner according to the first electric pulse, an exhaust port connected to the common flow path through a second valve portion that opens and closes in a pulsed manner according to the second electric pulse, and a drive air port, one end of the drive air port being connected to the common flow path, and a connection portion for connection to the pneumatic cylinder is formed at the other end of the drive air port.

However, while the rotation range of the human shoulder is 180° or more along the body side and is about 90° perpendicular to the body side, the conventional cylinder drive type rotation drive device has a problem that the rotation drive can be performed only in the range of 90° to 120°.

Figure 10:
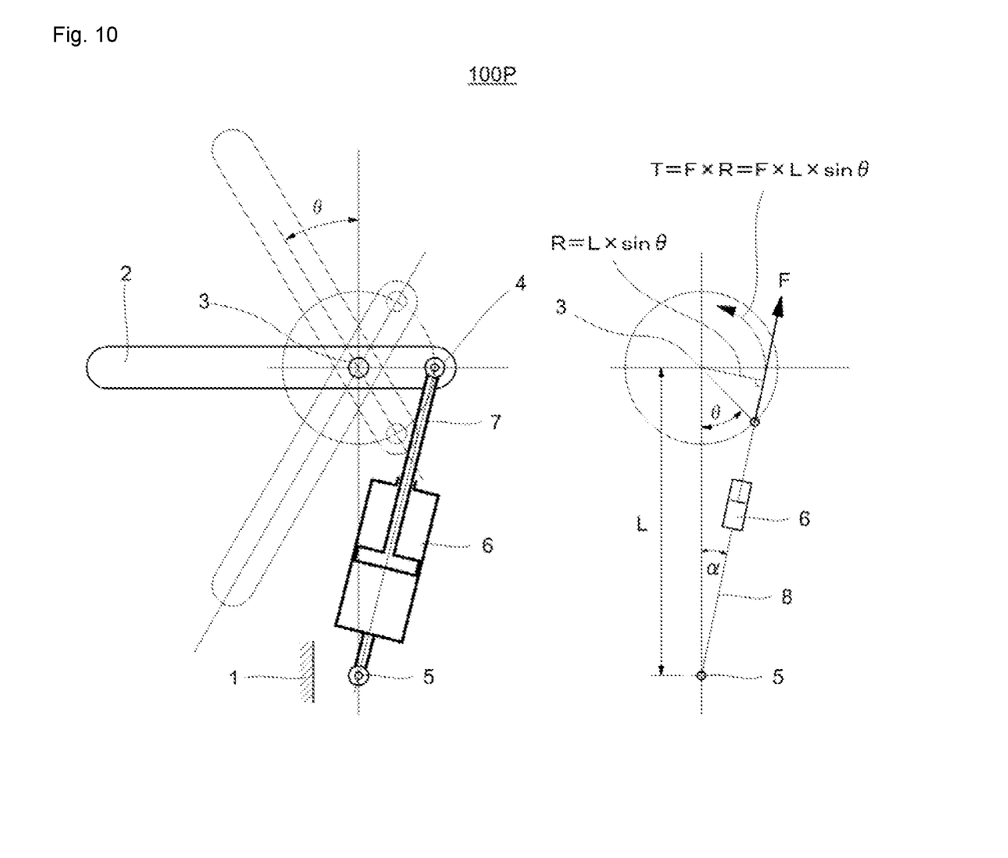
FIG. 10 shows a conventional rotation drive device 100P for rotating an arm 2 with one cylinder 6.

FIG. 10 shows a conventional rotation drive device 100P for rotating the crank member (arm) 2 with one cylinder 6. As shown, the rotation drive device 100P comprises a crank member 2 rotatable about a crank rotation axis 3 and a cylinder 6 rotatable about a cylinder rotation axis 5. The cylinder 6 and the crank member 2 is rotatably connected about a piston rotation axis 4 spaced from the crank rotation axis 3.

In this structure, all of the rotation axes 3, 4, and 5 can be supported by bearings, so that friction can be minimized. In addition, by properly sealing the sliding seal portion of the cylinder 6 and appropriately surface treating the metal surface of the sliding portion, it is possible to considerably reduce static friction and dynamic friction.

However, when the thrust force of the cylinder 6 is F, the distance between the crank rotation axis 3 and the cylinder rotation axis 5 is L, and the inclination angle of the cylinder 6 is $\alpha$, the torque T obtained is $T=F \times L \times \sin \alpha$. When the angle $\theta=0°$, $\alpha=0°$ and T=0. Similarly, when $\theta=180°$, $\alpha=0°$ and T=0. The torque T is maximized when the cylinder centerline 8 is tangential to the circle shown in the figure, and when $\theta$ approaches 0° or 180°, the torque approaches to 0. For this reason, the range in which the rotation drive is possible is practically about 90° to 120°, and the arm cannot be driven in a wide range such as from 0° to 180°, for example. Therefore, robots that perform the same operations as humans cannot be realized only by the PCT/JP2019/002971 technique.

There are already a variety of pneumatically driven rotary actuators that generate rotational motion. For example, there are also structures in which a plurality of blade-shaped plates are embedded in a rotor so as to be able to expand and contract and rotates a rotor with sealing an eccentric inner wall, or in which a combination of a rack pinion and an air cylinder is employed, or a structure like an engine. However, they cannot be used as an actuator for robot control. This is because the rotary actuator system has large friction, and can not control the speed and position freely, and the engine system can only rotate in one direction, and normal rotation, inversion rotation, or stopping at an arbitrary position can not be performed freely from structural reason.

PATENT LITERATURE

Patent Literature 1: Japanese Unexamined Patent Application Publication No. 2007-187296
Patent Literature 2: Japanese Unexamined Patent Application Publication No. 2006-057719
Patent Literature 3: Japanese Unexamined Patent Application Publication No. 2011-127560

SUMMARY OF THE INVENTION

Problems to be Solved by the Invention

The purpose of one aspect of the present invention is to realize a rotation drive device having a large rotational drive range of 150° or more, more preferably 170° or more, even more preferably 180° or more and/or to realize a rotation drive device that can reduce frictional force to as much as possible, and/or to realize a rotation drive device that is also capable of controlling position and/or speed, and/or to realize a rotation drive device for driving a robot that can perform human-like movements.

Means for Solving the Problem

In a preferable aspect, a rotation drive device of the present application comprises;
a crank member rotatable about a crank axis,
a first cylinder having a first piston and rotatable about a first cylinder rotation axis, and
a second cylinder having a second piston and rotatable about a second cylinder rotation axis, wherein;
the crank member and the first piston are rotatably coupled about a first piston rotation axis spaced from the crank axis, and
the crank member and the second piston are rotatably coupled about a second piston rotation axis spaced from the crank axis.

It is preferable that said first and/or second cylinders are pneumatic cylinders.

It is preferable that the rotation drive device further comprises a servo valve unit capable of pulsing an output air pressure on and off, and
wherein the first and/or second cylinders are driven by the servo valve unit.

In an another preferable aspect, a method of controlling the above mentioned rotation drive device comprises;
unloading the first cylinder or the second cylinder near the bottom dead center and/or the top dead center of said first or second cylinder.

It is preferable that the above mentioned method further comprises;
reversing the moving direction of the first piston or the second piston at the bottom dead center of the first or second cylinder in the process of rotating the crank member in one direction.

MODE FOR CARRYING OUT THE INVENTION

Figure 1:
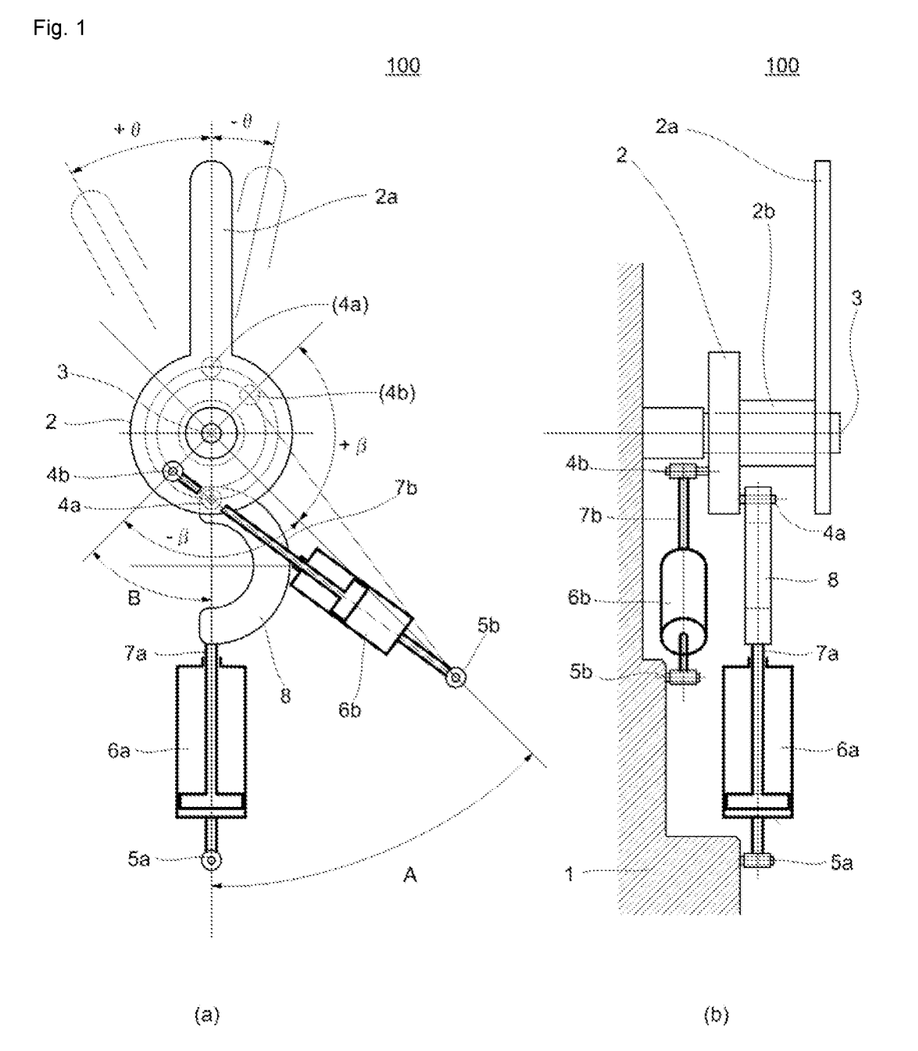
FIG. 1 shows a rotation drive device 100 according to an embodiment of the present invention. The main cylinder 6a is at the bottom dead center. (a) is a front view and (b) is a side view.
Figure 2:
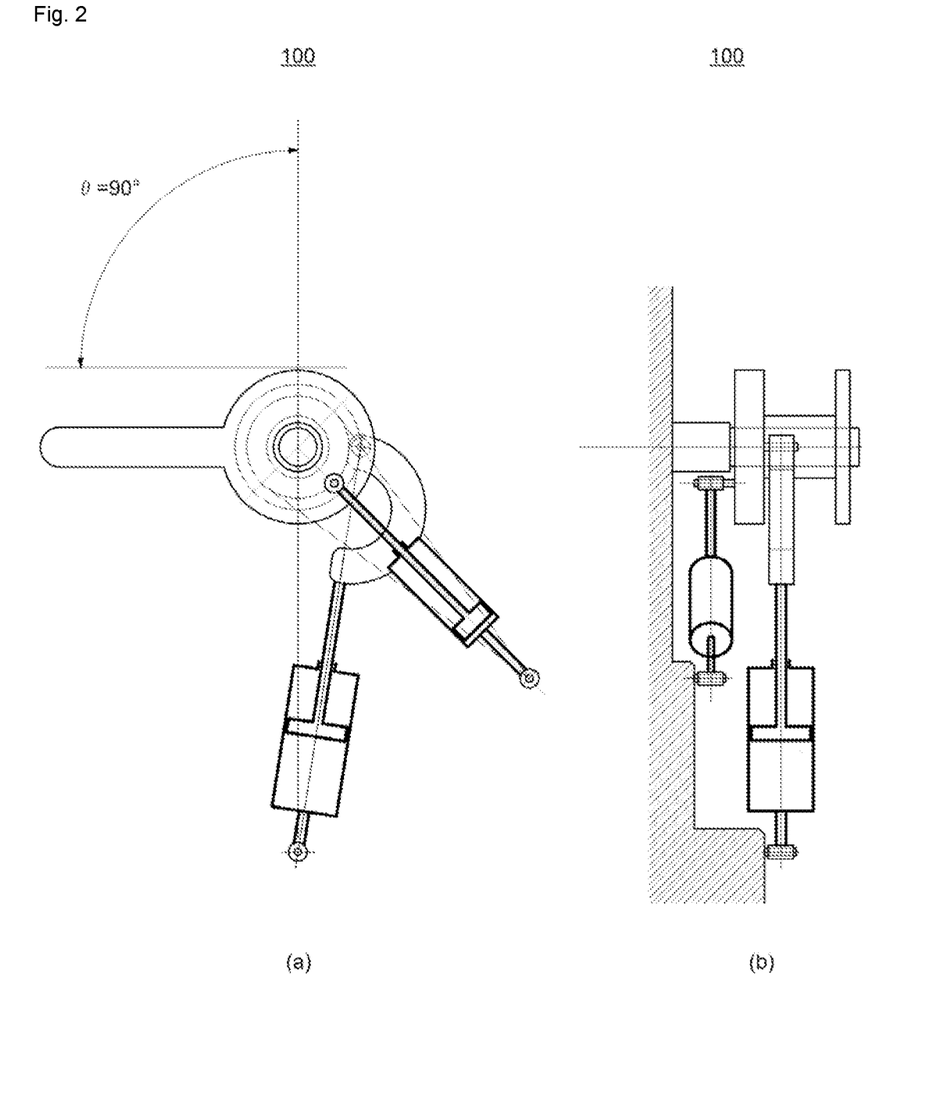
FIG. 2 shows a rotation drive device 100. The main cylinder 6a is located between the bottom dead center and the top dead center.
Figure 3:
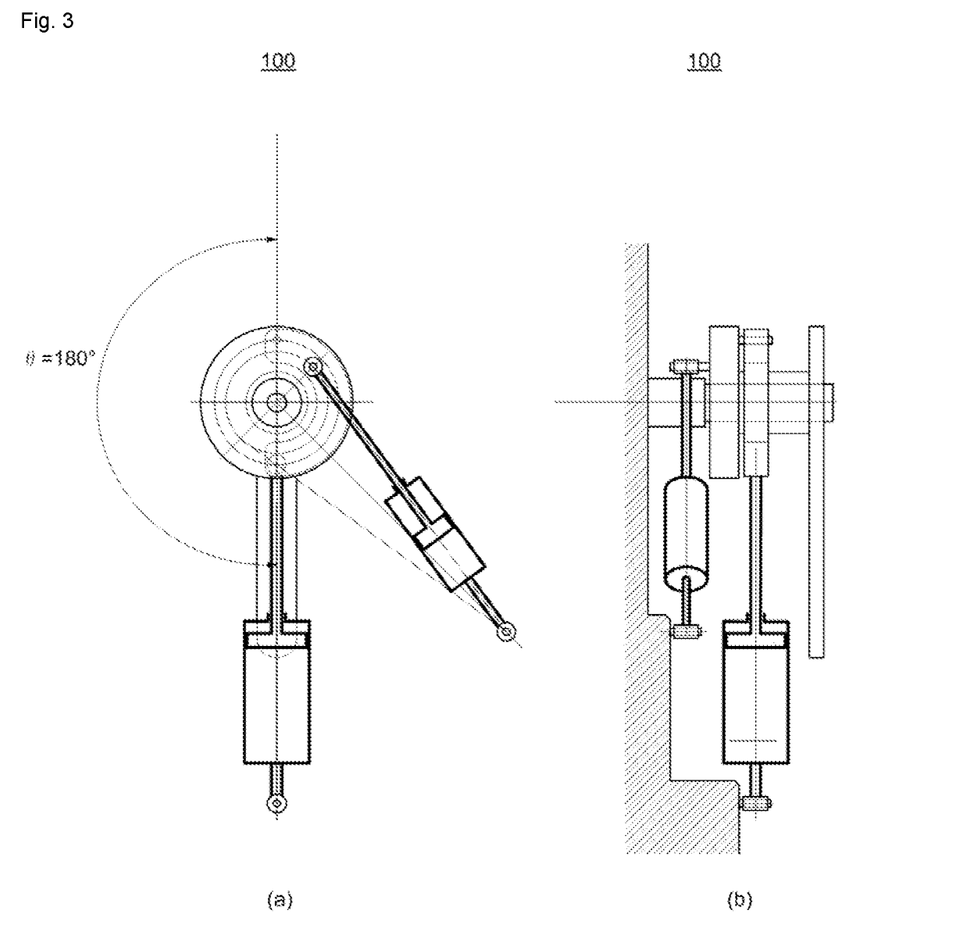
FIG. 3 shows a rotation drive device 100. The main cylinder 6a is at top dead center.

FIGS. 1 to 3 show a rotation drive device 100 according to an embodiment of the invention. In FIGS. 1 and 3, the main cylinder 6a is at bottom dead center and the top dead center, respectively, and in FIG. 2, the main cylinder 6a is in an intermediate position.

The rotation drive device 100 includes a crank member 2, a main cylinder (first cylinder) 6a, and a sub-cylinder (second cylinder) 6b. The main cylinder 6a has a main piston (first piston) 7a that moves forward and backward in a linear direction, and the sub-cylinder 6b has a sub-piston (second piston) 7b that moves forward and backward in a linear direction. The cylinders 6a and 6b of the present embodiment are pneumatic type, but may be hydraulic type. It is also possible to use an actuator of other types (or any other type of drive member) which is capable of moving the pistons 7a and 7b linearly forward and backward. In a typical cylinder, the piston and the piston rod move together. "Piston" in the present application may mean a piston rod or a piston and a piston rod.

The crank member 2 is rotatable about a crank rotation axis (crank axis) 3. The main cylinder 6a is rotatable about a main cylinder rotation axis (first cylinder rotation axis) 5a, and the sub-cylinder 6b is rotatable about a sub-cylinder rotation axis (second cylinder rotation axis) 5b.

The main piston 7a and the crank member 2 are rotatably connected to each other by a main piston rotation axis (first piston rotation axes) 4a separated from the crank rotation axis 3, and the sub-piston 7b and the crank member 2 are rotatably connected to each other by a sub-piston rotation axis (second piston rotation axis) 4b separated from the crank rotation axis 3. Therefore, the main cylinder 6a, the sub-cylinder 6b, and the crank member 2 form a link structure (four-section link structure) in which the rotation axes 5a and 5b are fixed ends and the rotation axes 4a and 4b are free ends. Although a disk-shaped crank member 2 is shown in the drawing, the shape, structure, and the like of the crank member 2 are arbitrary as long as the link structure can be configured. The rotation axes 3, 5a and 5b can be fixed to a common base 1, and the rotation axes 4a and 4b can be fixed to the crank member 2.

The crank member 2 may have an arm 2a that rotates integrally with the crank member 2. The arm 2a can be used, for example, as a limb of a robot or the like. The mounting angle of the arm 2a is arbitral. In the examples of FIGS. 1 to 3, the arm 2a and the crank member 2 are fixed so that the crank rotational angle (the angle formed between the arm 2a and vertical direction) θ is 0° and 180° when the main piston 7a is at the bottom dead center (see FIG. 1) and the top dead center (see FIG. 3), respectively. In the drawings, a boss 2b is disposed between the crank member 2 and the arm 2a, and the crank rotation axis 3 is supported in the opening of the boss 2b, but the crank rotation axis 3 may be supported on the outer side of the boss 2b via bearings.

The piston 7a may have a curved portion (bend) 8 so that the main piston 7a does not interfere with the crank rotation axis 3 when the arm 2a (or the crank member 2) is rotated to an angle of 180° or more. The curved portion 8 may have a shape complementary to the crank rotation axis 3, for example, an annular or ring or arc shape of about 180°. The annular shape, etc., may have an inner diameter that is larger than the outer diameter of the crank rotation axis 3 or the boss 2b.

It is desirable that the respective rotation axes 3, 4a, 4b, 5a and 5b are arranged so that the torque T2 generated by the sub-piston 7b in the crank member 2 becomes large in the vicinity of the top dead center or the bottom dead center where the rotational torque T1 generated by the main piston 7a in the crank member 2 becomes small. Furthermore, it is also desirable that the cylinders 6a and 6b do not interfere with each other, and that the components are arranged in a compact manner (the volume occupied by the device 100 is small). In view of these, the angle A formed by 5a-3-5b and/or the angle B formed by 4a-3-4b is preferably 30 to 60°, more preferably 40 to 50°. FIGS. 1 to 3 are the optimal case, in which the sub-piston rotation axis 4b rotates in the range of 0=−90 to +90° when the angles A and B are 45° and the main-piston rotation axis 4a rotates in the range of 0=0 to 180°. Of course, other arrangements are possible depending on the volume, shape, etc. of the installation space of the rotation drive device 100. For example, the angle A may be around 90° and the angle B may be around 0°. The piston rotation axes 4a and 4b may be a common axis.

Figure 4:
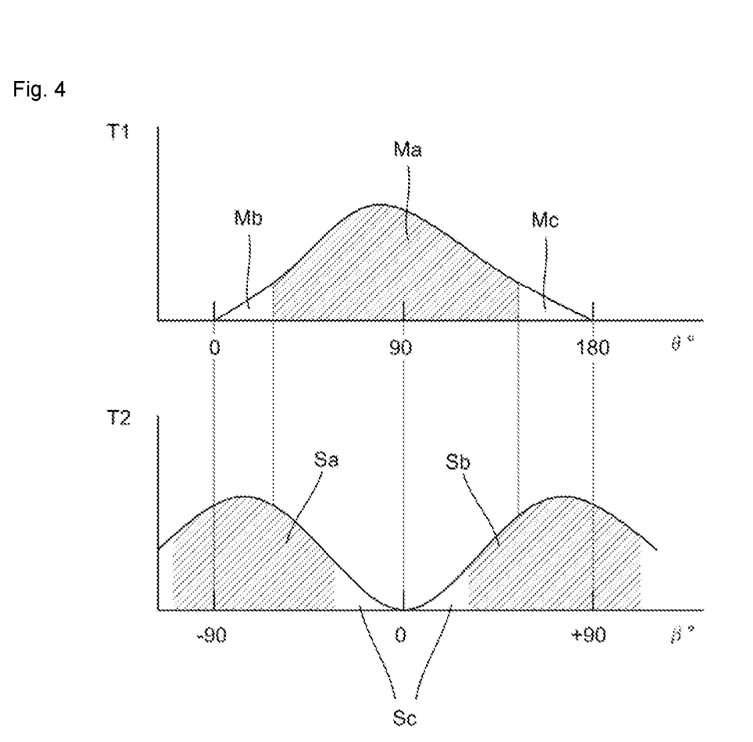
FIG. 4 shows the relationship between angles θ and β and torques T1 and T2 in the rotation drive device 100.

In the rotation drive device 100, the relationship between the angles θ and β and the torques T1 and T2 is as shown in FIG. 4. Since the torques T1 and T2 become maximum when the pistons 7a and 7b is at a tangential line of the circle which is the trajectory of the rotation axes 4a and 4b, respectively, the torque T1 becomes maximum in the vicinity of 90° (θ<90°), and the torque T2 becomes maximum in the vicinity of ±90° (−90°<β<90°), as shown in the drawing.

In this embodiment, the phase differences between the angles θ and β are about 90°, and the regions Sa and Sb in the vicinity of β=±90° where the torque T2 of the sub-cylinder 6b increases correspond to the regions Mb and Mc in the vicinity of θ=0° or 180° where the torque T1 of the main cylinder 6a decreases. For this reason, a sufficiently large torque T2 can be obtained even in the vicinity of θ=0° or 180°, where a sufficient torque T can not be obtained by the conventional rotation drive device 100P. As a result, the crank member 2 (arm 2a) can be driven in rotational angular ranges of θ=0° to 180° or more. Further, since the combined torque T1+T2 can be leveled, the stability and flexibility of rotation driving can be improved. The phase difference between the angles θ and β is preferably 80° to 100°, and particularly preferably 85° to 95°. By optimizing the outputs of the cylinders 6a and 6b, the positional relationships between the rotation axes 3, 4a, 4b, 5a and 5b, and the like, the combined torques T1+T2 can be further leveled.

In the rotation drive device 100, when the arm 2a is rotated in a specific direction, it is desirable to perform a control (control 1) of reversing the drive direction of the sub-cylinder 6b at a boundary in the vicinity of β=0°, and similarly reversing the drive direction of the main cylinder 6a at a boundary in the vicinity of θ=0° or 180°. By this, it is possible to prevent the torques T1 and T2 from acting in the opposite direction.

The main cylinder 6a can be set in an unloaded state (the state where both of the piston chambers are exhausted) in the regions Mb and Mc, and/or the sub-cylinder 6b can be set in an unloaded state (the state where both of the piston chambers are exhausted) in the region Sc. These controls can be referred to as control 2. For example, the cylinders 6a and 6b can be unloaded by opening both of the chambers to atmospheric pressure. As a result, the outputs (resistances) of the cylinders 6a and 6b in the regions Mb, Mc, and Sc become zero or almost zero, so that the problems of the torque T1 and the torque T2 acting in opposite directions can be solved. In addition, since the timing of reversing the driving direction is not strictly required, the control can be made easy.

When the cylinders 6a and 6b are pneumatic cylinders, the air is compressible, and the torque T1 in the regions Mb and Mc and the torque T2 in the region Sc are very small. Therefore, the strict timing of the control 1 is not required, and a great problem does not occur even if the control 2 is not performed. On the other hand, when the cylinders 6a and 6b are hydraulic cylinders or ball screw actuators, or the like, there is a high possibility that power loss, damage due to overload, or the like will occur due to the torques T1 and T2 in opposite directions, so that the control 1 needs to be performed more strictly, and the necessity of the control 2 increases.

Figure 5:
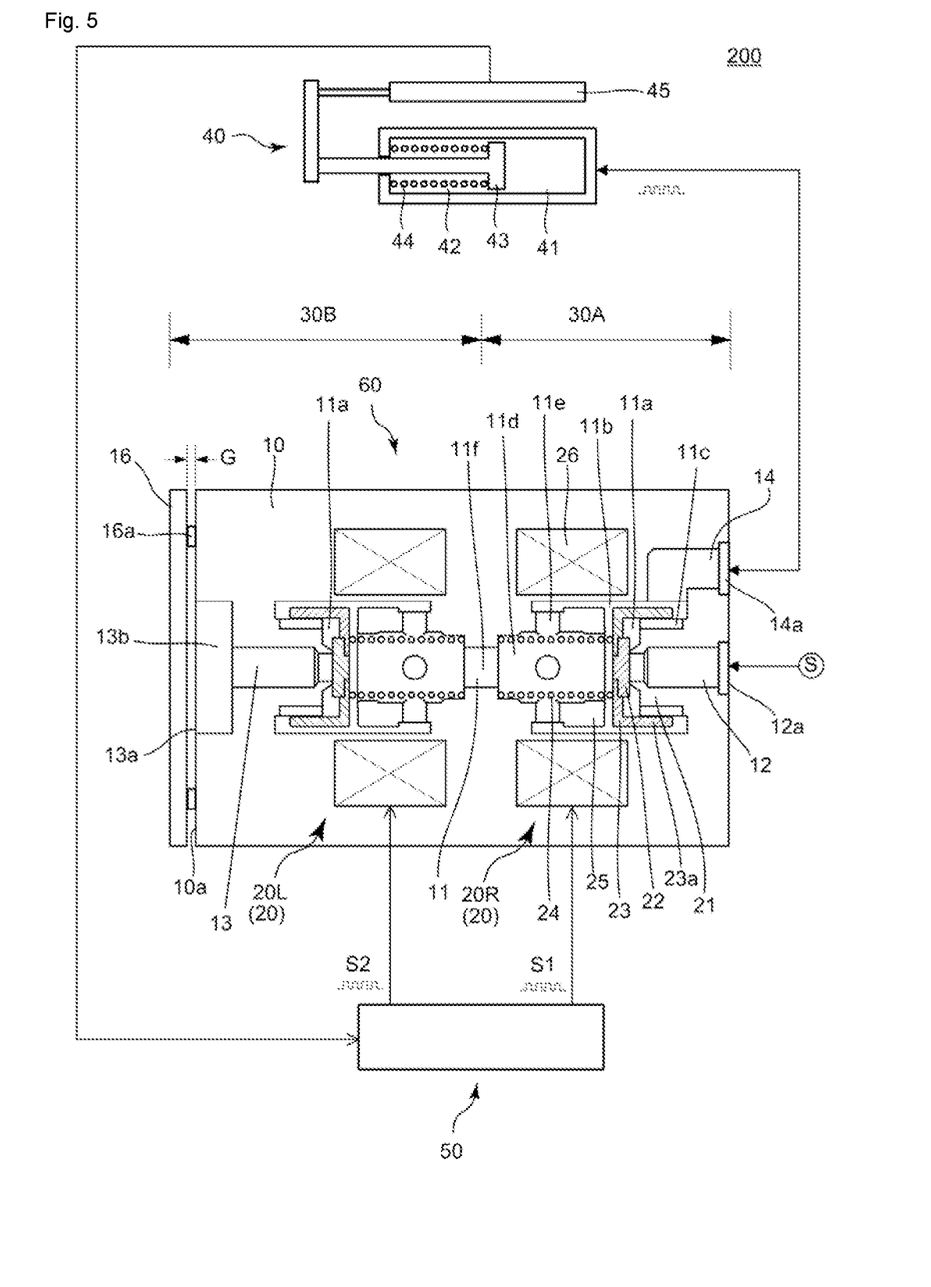
FIG. 5 shows a preferred embodiment of a servo valve unit 60 capable of driving cylinders 6a and 6b and a control system 200 thereof.

FIG. 5 shows a preferred form of a pneumatic servo valve unit 60 and its control systems 200 that can be suitably used to drive the cylinders 6a and 6b of the rotation drive device 100. The control system 200 includes a servo valve unit 60, a pneumatic cylinder 40 corresponding to a main cylinder 6a or a sub-cylinder 6b, and a controller 50. The servo valve unit 60 has a valve body 10 in which a hollow space such as a common flow path 11, a supply port (supply flow path) 12, an exhaust port (exhaust flow path) 13, and a drive air port (drive air flow path) 14 are formed. The valve body 10 may be an assembly of a plurality of parts made of metal, plastic, or the like.

One end of the supply port 12 is connected to the common flow path 11 via a first valve portion 20R capable of a pulsed opening and closing operation in accordance with the first electric pulse S1. The other end may have a connection part 12a for connecting to a source of high pressure air, such as a compressor or cylinder, for supplying high pressure air S. One end of the exhaust port 13 is connected to the common flow path 11 via a second valve portion 20L capable of a pulsed opening and closing operation in accordance with the second electric pulse S2. The other end of the exhaust port 13 is connected to the outside (e.g., atmospheric pressure) through an opening 13a in the outer wall 10a of the valve body 10. One end of the drive air port 14 is constantly connected to the common flow path 11. The other end of the drive air port 14 may have a connection part 14a, such as a joint, for connecting to one of the cylinder chambers 41 of the pneumatic cylinder 40. In the figure, the common flow path 11, the supply port 12 and the exhaust port 13 extend in the axial direction of the valve body 10, and the drive air port 14 is drawn out in the radial direction from a suitable position of the common flow path 11, however, other embodiments are possible.

The first valve portion 20R and the second valve portion 20L of the present embodiment have the same symmetrical structure. In the drawings, for simplicity, reference numerals of some members of the second valve portion 20L are omitted. Hereinafter, when it is not necessary to distinguish the first valve portion 20R and the second valve portion 20L, they are simply referred to as the valve portion 20. The valve portion 20 of the present embodiment includes a nozzle 21 formed at the tip of the supply port 12 and the exhaust port 13, a valve seat 22 which can close the nozzle 21 by abutting against the tip of the nozzle 21, a magnetic member 23 which can move in the axial direction integrally with the valve seat 22, a biasing member 24 such as a spring for biasing the valve seat 22 and the magnetic member 23 in the axial direction, a fixed magnetic core 25 arranged apart from the nozzle 21 in the axial direction, and a solenoid 26 for exciting the fixed magnetic core 25. The magnetic member 23 may have a side wall 23a complementary to the outer shape of the nozzle 21 for guiding the axial movement of the magnetic member 23.

In a state in which the solenoid 26 is not energized, the valve seat 22 is in contact with the nozzle 21 by the force of the biasing member 24, so that the valve portion 20 is OFF (closed state), and when the solenoid 26 is energized, the valve seat 22 is separated from the nozzle 21 by the magnetic force of the fixed magnetic core 25, and the valve portion 20 is turned ON (open state).

The space between the nozzle space 11a around the valve seat 22 of the first valve portion 20R and the nozzle space 11a around the valve seat 22 of the second valve portion 20L is always connected by the common flow path 11. That is, the nozzle space 11a and the outer peripheral space 11b around the fixed magnetic core 25 are connected via an axial through groove 11c formed in the side surface of the nozzle 21, and the outer peripheral space 11b and the spring space 11d accommodating the biasing member 24 are connected by a radial through hole 11e. A plurality of the through grooves 11c and the through holes 11e may be formed at intervals in the circumferential direction of the nozzle 21. The spring spaces 11d of the left and right valve portions 20R and 20L are connected to each other by a communication passage 11f.

Hereinafter, the left half and the right half of the servo valve unit 60 may be referred to as servo valve elements 30A and 30B.

The pneumatic cylinder 40 has cylinder chambers 41 and 42, a piston 43 corresponding to the main piston 7a or the sub-piston 7b, and a biasing means 44 such as a spring for biasing the piston 43, and the axial position of the piston 43 can be detected by a position sensor 45. The shape of the cylinder chambers 41 and 42 is arbitrary, and the cylinder chambers 41 and 42 may have a shape other than a cylindrical shape. The controller 50 generates first and second electric pulses S1 and S2. The first and second electric pulses S1 and S2 may be signals depending on the position of the piston 43, the desired speed, etc. The first and second electric pulses S1 and S2 may have a duty ratio that depends on the position or speed of the piston 43. The controller 50 may be, for example, a computer.

When the electric pulse S1 is turned ON and the electric pulse S2 is turned OFF, the first valve portion 20R is turned ON and the second valve portion 20L is turned OFF, so that the high-pressure air S is supplied from the supply port 12 to the cylinder chamber 41 via the common flow path 11 and the drive air port 14, and the piston 43 can be moved leftward. When the electric pulse S1 is turned OFF and the electric pulse S2 is turned ON, the first valve portion 20R is turned OFF and the second valve portion 20L is turned ON, the air in the cylinder chamber 41 is discharged to the outside from the opening 13a through the drive air port 14, the common flow path 11 and the exhaust port 13, and the piston 43 is moved rightward by the force of the biasing means 44. When both of the electric pulses S1 and S2 are turned OFF, the supply and exhaust to and from the cylinder chamber 41 are stopped.

In this manner, the output air pressure to the cylinder chamber 41 which opens and closes the valve portions 20R and 20L in a pulsed manner can be switched on/off (supply/stop can be switched or exhaust/stop can be switched) in a pulsed manner by the control of the electric pulses S1 and S2. By speeding up the switching, it is possible to precisely and smoothly control the position of the piston 43. Basically, when the duty ratio of the electric pulse S1 or S2 is increased, the driving force of the piston 43 is increased, and when the duty ratio is decreased, the driving force of the piston 43 is decreased. Therefore, when the difference Δd between the current position and the target position of the piston 43 is large, the duty ratio is increased to move the piston 43 at a high speed, and when the difference Δd becomes small, the duty ratio is decreased to decelerate the piston 43, and the duty ratio is set to zero (signal stop) to stop the piston 43. However, in order to perform rapid positioning and follow-up control, it is preferable to perform control such that the movement is started at a slow speed, gradually accelerated, and then decelerated, and stopped. In addition, it is preferable to control to freely change the speed in accordance with the kind of the task of the robot or the like. For these controls, it is preferable to heighten the speed of the supply/exhaust switching, and it is desirable that the maximum frequency of the supply/exhaust switching be 100 Hz or more, preferably 300 Hz or more, more preferably 500 Hz or more, and particularly preferably 1000 Hz or more. In the servo valve unit 60 of the present embodiment, high-speed switching of 300 to 500 Hz is realized in a prototype stage, and it has been confirmed that a motion close to a human can be realized in a prototype of an arm unit of a humanoid robot incorporating a pneumatic cylinder driven by the servo valve unit 60. The inventors of the present application believe that 1000 Hz can be achieved by future improvements.

The servo valve unit 60 may further include a silencer plate 16 for reducing exhaust noise. The silencer plate 16 is attached to the valve body 10 at a position overlapping with the opening 13a, i.e., at a position blocking the opening 13a, with a gap G from the outer wall 10a. The silencer plate 16 preferably has a sufficiently larger area than the opening 13a and is parallel to the outer wall 10a. The exhaust port 13 may have a cavity 13b having a large cross-sectional area on the opening 13a side. Since the exhaustion air gradually expands from the nozzle 21 to the outer periphery of the gap G through the cavity portion 13b, it is possible to effectively alleviate the burst sound at the time of exhaustion to the atmosphere. When the circumferential length of the hollow portion 13b is L, the gap is G, and the opening area of the nozzles 21 is SA1, it is desirable that L×G is approximately equal to SA1. The cross-sectional area of the exhaust port 13 from the nozzle 21 toward the opening 13a may be increased in multiple stages or gradually. If the gap G is increased or decreased in accordance with the exhaust pressure by fixing the silencing plate 16 with a elastic member 16a having a spring property or the like, the exhaust pressure is further leveled to improve the silencing effect. Although the above arrangement is not 100% muffling, a significant muffling effect can be achieved while achieving the space saving which is an important object of the present invention.

Figure 6:
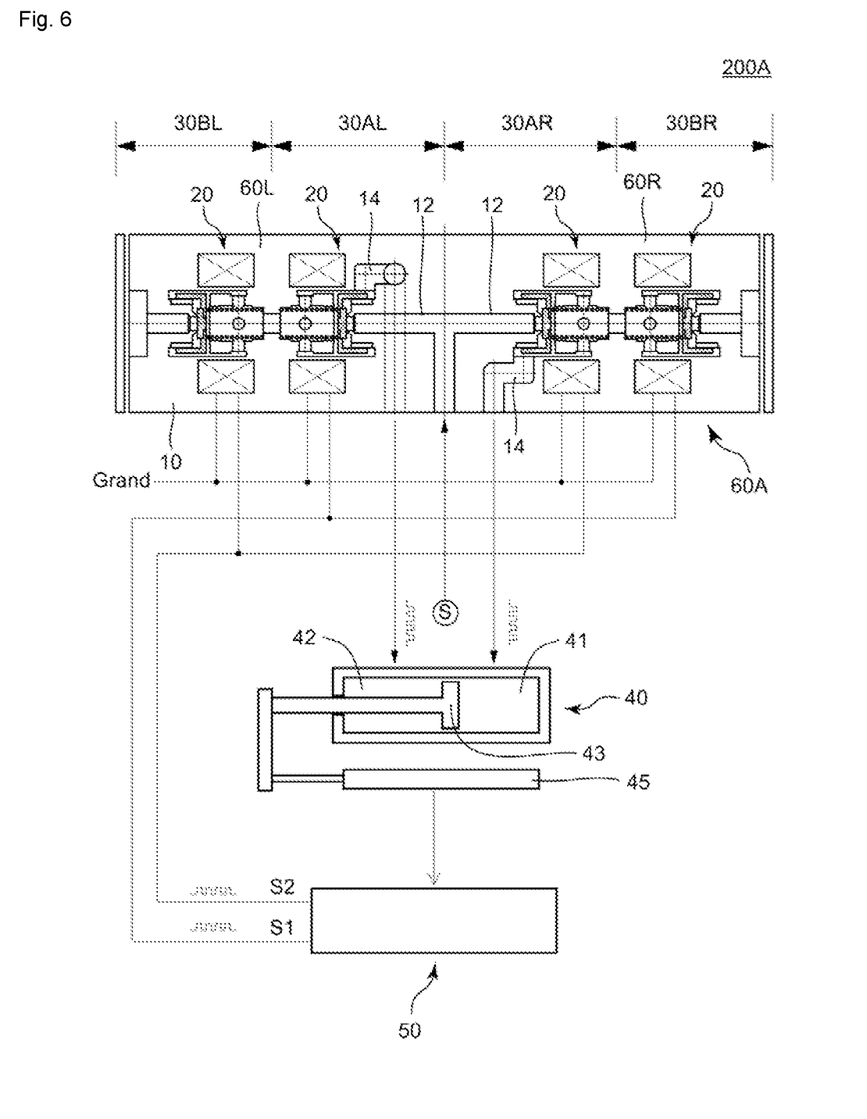
FIG. 6 shows another embodiment of servo valve unit 60A and its control system 200A.

FIG. 6 shows another embodiment of a servo valve unit 60A and its control system 200A. The servo valve unit 60A has a structure in which two servo valve units 60R and 60L are housed in a single valve body 10 so that their supply ports 12 face each other. The servo valve unit 60A includes four servo valve elements 30AL, 30AR, 30BL, and 30BR. The servo valve units 60R and 60L have the same configuration as that of the servo valve unit 60, but the two supply ports 12 are connected at the center and drawn out from the side surface of the valve body 10. The drive air ports 14 are drawn out from the side surface of the valve body 10 and connected to the respective cylinder chambers 41 and 42 of the pneumatic cylinder 40. Connection parts 12a and 14a of the supply port 12 and the drive air port 14 are preferably provided on the same side of the valve body 10 and/or adjacent to each other.

The controller 50 applies electric pulses S1 and S2 to the left and right servo valve units 60R and 60L in accordance with the piston position, the desired piston speed, and the like of the pneumatic cylinder 40. In this example, an electric pulse S1 is applied to servo valve elements 30AL and 30BR, and an electric pulse S2 is applied to servo valve elements 30BL and 30AR. As a result, the servo valve units 60R and 60L operate in the same manner as the servo valve unit 60 to drive the piston 43 to the left and right. In the wiring configuration in the figure, the servo valve device 30AL and the servo valve device 30BR are simultaneously excited, and the servo valve device 30BL and the servo valve device 30AR are simultaneously excited. However, it is also possible to independently excite each of the valve devices, and the pulse numbers of the electric pulses to the servo valve devices 30AL, 30AR, 30BL and 30BR may be changed independently.

In the servo valve units 60 and 60A, the pneumatic cylinder 40 (6a,6b) can be controlled with high accuracy without using a servo amplifier, and the manufacturing accuracy or bleeding of air as in the conventional pneumatic servo valve is unnecessary. In particular, by setting the ON/OFF switching speed of the valve portion or the supply/exhaust switching speed of the pneumatic cylinder to 100 Hz or more, smooth control of the moving speed and stopping position of the pistons 43 (7a,7b) can be achieved. By setting the switching speed to 300 Hz or more, more preferably 500 Hz or more, more preferably 1000 Hz or more, the controllability of the moving speed and the stop position of the pistons can further be enhanced. It should be noted that as each of the cylinder chambers and flow paths has a certain volume, and the piston has a moment of inertia and a slight friction, the piston operates smoothly without any trouble even if the supply and exhaustion of air are switched in a pulsed manner.

The inventor of the present application produced a prototype of the rotation drive device 100 using the servo valve unit 60A. The cylinders 6a and 6b of the rotation drive device 100 had an inner diameter of 60 mmϕ, and high-pressure air of 0.4 MPa was used. The size of the servo valve unit 60A is 20×25×70 mm. Using this prototype, it was confirmed that the rotation speed and the stop position can be freely controlled in the range of 0° to 180° with attaching a weight of up to 5.3 Kg to the tip of an iron arm with 63 cm length. Videos showing the movement of the prototype was made, and uploaded as a youtube video (URL: https://youtu.be/mAEVludfmno). In addition, an arm unit of a human-sized humanoid robot incorporating 8 sets of the above prototypes was prepared, and it was confirmed that it was possible to freely raise and lower a weight of 12.5 kg attached to the tip (palm part) of the arm. The state of the movement is shown in the youtube video (URL: https://youtu.be/7cVjNuoC_w8, https://youtu.be/FxbWDolcv_k, https://youtu.be/5XO8cX9oREA, https://youtu.be/0qnxH6PFCwo)). In this arm unit, all eight servo valve units are accommodated in the upper arm portion.

Since the motive for the development of the present invention is to realize a humanoid robot (or humanoid disaster robot), the present invention has been mainly described as being applied to a humanoid robot, but the present invention is also applicable to various robots other than the humanoid robot (for example, a lizard type, a centipede type, a multi-legged robot, a four-legged animal robot, or the like). The present invention can be applied to robots other than disaster robots, such as nursing care robots and work assisting robots. Furthermore, the present invention is applicable to fields other than robots. The present invention is widely applicable to driving of a movable member (arm la) in an industrial machines or household appliances.

The cylinder (first cylinder and second cylinder) of the present application is a linear actuator capable of linearly moving a piston (or a drive rod) forward and backward. The cylinder of the present application includes not only a cylinder type actuator, but also other types of actuators such as a ball screw type actuator and a ball spline type actuator. For use in a humanoid robot, a pneumatic cylinder capable of absorbing a reaction force by compressibility of air is preferred.

The dimensions, shapes, arrangements, numbers, materials, characteristics, and the like of the rotation drive device, the servo valve unit, or the control system described in the above embodiments, or their constituent elements are examples, and these can be appropriately changed within the scope the invention described in the claims.

EXPLANATION OF REFERENCE SYMBOLS 1 base
2 crank member
2a arm
2b boss
3 crank rotation axis
4a, 4b first and second piston rotation axes
5a, 5b first and second cylinder rotation axes
6a, 6b first and second cylinders
7a, 7b first and second pistons
8 curved part
10 valve body
11 common flow path
12 supply port
13 exhaust port
14 drive air port
16 silencer
50 controller
60, 60A Servo valve unit
100 rotation drive
200, 200A control system

The invention claimed is:

1. A rotation drive device comprising:
a crank member rotatable about a crank axis, a first cylinder having a first piston and rotatable about a first cylinder rotation axis, and a second cylinder having a second piston and rotatable about a second cylinder rotation axis, wherein;
the crank member and the first piston are coupled for rotation about a first piston rotation axis spaced from the crank axis, the crank member and the second piston are coupled for rotation about a second piston rotation axis spaced from the crank axis, and the first piston comprises a curved portion complementary to the crank axis.

2. A rotation drive device according to claim 1, wherein an angle formed by a straight line connecting the crank axis and the first piston rotation axis and a straight line connecting the crank axis and the second piston rotation shaft is 30 to 60'.

3. A rotation drive device according to claim 2, wherein the angle formed by the straight line connecting the crank axis and the first cylinder rotation axis and the straight line connecting the crank axis and the second cylinder rotation axis is 30 to 60°.

4. A rotation drive device according to claim 1, wherein the angle formed by a straight line connecting the crank axis and the first cylinder rotation axis and a straight line connecting the crank axis and the second cylinder rotation axis is 30 to 60°.

* * * * *

UNITED STATES PATENT AND TRADEMARK OFFICE
CERTIFICATE OF CORRECTION

PATENT NO. : 11,181,129 B2
APPLICATION NO. : 17/057858
DATED : November 23, 2021
INVENTOR(S) : Chikanari Kubo

Page 1 of 1

It is certified that error appears in the above-identified patent and that said Letters Patent is hereby corrected as shown below:

In the Claims

Column 12, Line 53, Claim 2:
"to 60'." should read --to 60°--.

Signed and Sealed this
Fifth Day of July, 2022

Katherine Kelly Vidal
*Director of the United States Patent and Trademark Office*